United States Patent Office 3,455,804
Patented July 15, 1969

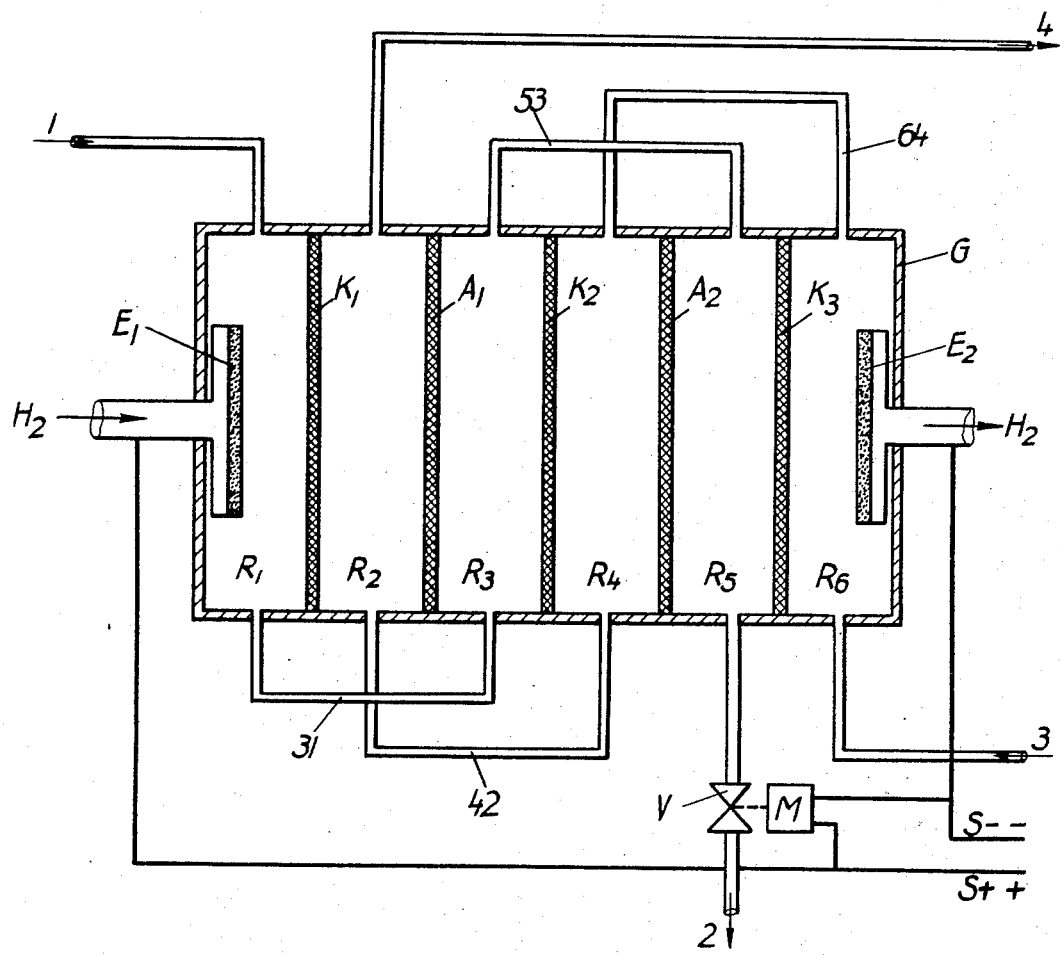

3,455,804
PROCESS FOR REVERSIBLE ELECTRODIALYSIS
Eduard Justi and August Winsel, Braunschweig, Germany, assignors to Siemens-Schuckertwerke Aktiengesellschaft, Berlin and Erlangen, Germany, and VARTA Aktiengesellschaft, Frankfurt am Main, Germany, both corporations of Germany
Filed Oct. 15, 1963, Ser. No. 316,398
Claims priority, application Germany, Oct. 17, 1962, S 82,066
Int. Cl. B01d 13/02
U.S. Cl. 204—181     12 Claims

ABSTRACT OF THE DISCLOSURE

The invention concerns a process of elctrodialytically transferring a dissolved electrolyte from a first solution containing the electrolyte to be transferred into a second solution to be concentrated with said electrolyte. The process comprises passing the two solutions containing electrolyte counter-currently through a plurality of electrode spaces separated by ion-exchange membranes. The invention also concerns the apparatus for carrying out the process.

The present invention relates to a process for carrying out countercurrent electrodialysis, and more particularly to the transfer by electrodialysis of a dissolved electrolyte from a first solution into a second solution in a multi-cell electrodialysis apparatus by means of reversibly operating electrodes.

It is one object of the present invention to provide a simple and effective process of carrying out reversible electrodialysis of dissolved electrolytes.

Another object of the present invention is to provide a simple and effective process of electrodialytically transferring a dissolved electrolyte by means of reversibly operating electrodes in multiple cell electrodialysis apparatus.

A further object of the present invention is to provide a simple and effective electrodialysis apparatus for carrying out reversible electrodialysis of dissolved electrolytes.

Other objects of the present invention and advantageous features thereof will become apparent as the description proceeds.

When electrodialyzing a monovalent salt AB with the anion $A^-$ and the cation $B^+$ in aqueous solution, the anion $A^-$ migrates into the anode space and forms therein the acid HA while the cation $B^+$ migrates into the cathode space and forms therein the base BOH. A membrane provided between the electrodes prevents reaction and recombination of the resulting acid HA and base BOH to the salt AB which, without such a membrane, would occur due to convection and diffusion.

Under ideal conditions, the energy required for separating said acid and base is equal to the energy of neutralization. Such ideal conditions are nearly realized when the current is carried by one kind of ions only in the membrane which thus has the transport number or, respectively, the transfer number 1. However, when electrodialyzing aqueous systems, usually decomposition of the water is encountered. Inasmuch as the hydrogen and oxygen evolved thereby are not technically utilized, the energy consumed in their evolution represents a considerable loss which impairs the economy of such an electrodialysis process. For instance, the production of fresh water from sea water by electrodialysis with ion exchange membranes is highly uneconomical due to the evolution of hydrogen and oxygen which cannot be utilized when carried out on a vessel at sea.

This disadvantage of the known electrodialysis process is eliminated by using gas diffusion electrodes or valve electrodes for reversible electrodialysis of ion disperse solutions in cells with one or several dialysis membranes between anode and cathode. Such gas diffusion or valve electrodes permit reversible permeation of the respective ion obtained by decomposition of the aqueous solvent; i.e. the decomposition product obtained at one of the electrodes from one of the ions of the solvent is conducted to the respective electrode of opposite polarity and is combined at said electrode with the decomposition product obtained from the other ion of the solvent. Thus no free decomposition products of the solvent are produced as energy consuming waste products and the energy used for their evolution is almost completely recovered by the subsequent recombination of the decomposition products.

In this process of reversible electrodialysis the electrodes are selected as follows:

(1) Reversible hydrogen electrodes are used as cathode and anode, respectively. The hydrogen evolved at the cathode is conducted from the cathode space to the anode space and is solubilized electrochemically by said anode. Thereby, transfer of the $H^+$-ion resulting from the electrochemical decomposition of the aqueous solvent takes place.

(2) Reversible oxygen electrodes are used as anode and cathode, respectively. The oxygen evolved at the anode is conducted from the anode space to the cathode space and is solubilized electrochemically by said cathode. Thereby, transfer of the $OH^-$-ion resulting from the electrochemical decomposition of the aqueous solvent takes place.

(3) In place of a hydrogen electrode which causes transfer of $H^+$-ions between the electrolyte phase and the gaseous hydrogen phase, electrodes can be used which are capable of adsorbing and storing atomic hydrogen. For this purpose, electrodes composed of metals of the VIII group of the periodic table of Mendelejeff may be used. Palladium, for instance, forms a hydrogen-rich alloy $PdH_{0.55}$ which, in contact with an aqueous electrolyte solution, exchanges hydrogen $H_2$ reversibly therewith. Raney nickel also has the property of adsorbing and storing large amounts of atomic hydrogen, namely up to 1.2 hydrogen atoms per nickel atom, and of exchanging said hydrogen reversibly with an aqueous electrolyte solution. Almost all the metals of the VIII group and the metals of the IV sub-group of the periodic table of Mendelejeff possess such properties. When hydrogen adsorbing and storing electrodes are used, they are allowed to be cathodically charged with hydrogen to their full capacity. Thereafter, they are introduced into the anode space and are anodically discharge therein. As soon as the adsorbed and stored hydrogen has been discharged, the cathode is returned into the cathode space wherein cathodic charging with hydrogen is repeated. In this manner cathode and anode always operate at about the hydrogen potential corresponding to the volatility of the hydrogen adsorbed by and stored in the electrode metal.

(4) An analogous result is achieved when operating with oxygen adsorbing and storing electrodes. A silver-silver oxide electrode as used as positive electrode in silver-zinc storage batteries has proved to be specially suitable for this purpose. In an alkaline medium such as in alkaline storage batteries, hydroxide electrodes such as nickel hydroxide, iron hydroxide, or cadmium hydroxide electrodes may be employed. Otherwise the procedure is the same as described hereinabove under (3) whereby the oxygen-charged electrode is introduced into the cathode space and, after being cathodically discharged, is returned to the anode space.

It is, of course, understood that the electrodes used in this process must be resistant to the catholyte as well as the anolyte under the respective working conditions. The anodes and the cathodes need not be of the same material. For instance, if an acidic anolyte and an alkaline catholyte are used, the hydrogen electrode may contain platinum or palladium and may preferably be a hydrogen electrode composed of carbon and containing, finely distributed therethrough, platinum or palladium. It may also be a double skeleton catalyst electrode containing Raney palladium or Raney platinum embedded in an acid resistant carrier skeleton of platinum, palladium, or carbon. The cathode may be of a nickel, iron, or other non-noble, alkali resistant metal skeleton having embedded therein Raney nickel or the like.

This process of reversible electrodialysis is advantageously employed, for instance, in the regeneration of carbonated electrolyte solutions used in fuel cells, in which the energy from carbon-containing fuels such as carbon monoxide, methane, alcohols, formic acid, and other known fuels is directly converted into electrical energy. In this process the anode space contains an aqueous solution of potassium carbonate and is separated from the cathode space by a cation exchange membrane with strongly ionized $SO_3H$-groups. The current transfer in said cation exchange membrane is mainly effected by the cation $K^+$. When using 3N potassium hydroxide solution in the cathode space, about 80% of the $K^+$-ions are selectively transferred through such a membrane to the cathode space. The $K^+$-ions transferred by the current into the cathode space react therein with the $OH^-$-ions produced at the cathode to yield potassium hydroxide while the hydrogen evolved at the cathode is conducted to the anode where it combines to water by reaction with the OH-ions formed on dissociation of the potassium carbonate first to potassium ions and potassium carbonate $KCO_3^-$-ions and then by reaction of the $KCO_3^-$-ions with water to potassium bicarbonate and hydroxyl $OH^-$-ions whereby the hydroxyl ions deliver their electrons to the anode.

When carrying out this reversible electrodialysis, especially when using hydrogen electrodes, an increase of the proton concentration in the anode space and also in the anode itself is observed. This change of the pH-value considerably impairs the capacity of the hydrogen anodes in alkaline solution and may even cause corrosion of non-noble metals of the anode.

It is an especially important object of the present invention to overcome this difficulty by operating in a counter-current electrodialysis process.

Other objects of the present invention and advantageous features thereof will become apparent as the description proceeds.

According to the present invention a dissolved electrolyte is electrodialytically transferred from a solution I into a solution II in a multi-cell apparatus with alternating series of concentration and dilution cells defined by selective ion exchange membranes.

In said apparatus solution I is conducted to the first electrode chamber, the electrode of which has the same polarity as the ion which is not derived from the solvent. Subsequently, the solution passes successively through the cells with odd numbers of the apparatus having $2n$ cells. Those cells are defined by $2n-1$ ion exchange membranes. Thereby, $n$ indicate membranes which are selective for the ion not derived from the solvent while $n-1$ indicate membranes which are selective for the ion of opposite polarity which membranes are arranged alternately starting with chamber 1 defined by a membrane which is selective for the ion not derived from the solvent. Solution II to be concentrated countercurrently flows through the cells with even numbers starting with the chamber of the electrode of opposite polarity $2n$. Reversibly operating hydrogen electrodes or, respectively, oxygen electrodes are used thereby.

Hydrogen electrodes as well as oxygen electrodes operating as gas diffusion electrodes can be employed in the process according to the present invention. When using, for instance, fuel cell electrodes, the hydrogen evolved at the cathode is conducted, after diffusion through said electrode, to the anode at which it is brought into solution electrochemically thereby forming hydrogen ions. Alternately, when using oxygen electrodes, the anode is the electrode at which oxygen is evolved, while the cathode is the solution electrode at which the oxygen is brought into the solution electrochemically.

As dialyzing membranes there are used ion exchange membranes which are selective and permeable for anions or, respectively, cations. According to the present invention anion exchange membranes and cation exchange membranes are alternately arranged in the electrolyte chamber between the electrodes.

The attached drawing serves to illustrate the multi-cell apparatus according to the present invention and the manner in which the process of the present invention is carried out. In said drawing a dialysis cell, consisting of six chambers, is illustrated as it is used, for continuous regeneration of alkaline electrolyte solutions of oxyhydrogen batteries which are diluted by reaction water. In said drawing $R_1$ indicates the anode chamber, $R_6$ the cathode chamber, $E_1$ a hydrogen anode, and $E_2$ a hydrogen cathode, preferably a valve electrode. The chambers are separated by cation exchange membranes $K_1$, $K_2$ and $K_3$ and anion exchange membranes $A_1$ and $A_2$. Excess potassium hydroxide solution diluted with reaction water is passed from the oxyhydrogen element into anode chamber $R_1$ through conduit 1. Said solution flows from chamber $R_1$ through pipe 31 into odd numbered chamber $R_3$ and through pipe 53 into odd numbered chamber $R_5$ and is discharged from the dialysis cell through pipe 2 provided with valve V. The electrolyte solution of the oxyhydrogen element, is circulated through the multi-cell reversible dialysis apparatus according to the present invention. It enters cathode chamber $R_6$ of the dialysis cell through pipe 3, and flows through pipe 64 into even numbered chamber $R_4$ and from there through pipe 42 into even numbered chamber $R_2$ from where it is discharged through pipe 4 and returned to the oxyhydrogen element. Preferably, the velocity of flow is adjusted in such a manner that substantially no increase in concentration of the solutions passing through the cell takes place. When electric current is passed through the cell, hydrogen is dissolved at the anode, while the equivalent amount of hydrogen is evolved at the cathode and conducted back to the anode. Potassium ions $K^+$ and an equivalent amount of hydroxyl ions $OH^-$ are introduced into the circulating electrolyte through the chambers with even numbers by the action of the current, while further dilution of the excess potassium hydroxide solution on its way through the odd numbered chamber $R_1$, $R_3$, and $R_5$ takes place. The electrolyte concentration in said chamber $R_5$ has then become so low that only slightly alkaline water is discharged from the cell through valve V and pipe 2.

To adjust the velocity of flow to the current supply, valve V may be opened more or less by power magnet M which is connected to the current supply as indicated in the drawing. Thereby, the cell potential difference serves as controlling factor because the potential difference varies noticeably even at a constant flow of the dialyzed solution when the electrolyte concentration in the solution in chamber $R_5$ is very considerably reduced. In this case magnet M causes further opening of valve V thus increasing the electrolyte flow and decreasing the potential difference. When operating at a predetermined discharge velocity, the current supply may also be controlled by maintaining a constant predetermined potential difference in the dialysis cell. This type of control is especially advantageous for removing water from the electrolyte of oxyhydrogen elements, because the amount of reaction water produced therein is not constant due to the variations in load of the oxyhydrogen elements and thus the velocity of flow between inlet conduit 1 and discharge conduit 2 is determined by the formation of reaction water.

The solution to be dialyzed according to the above example is introduced into anode chamber $R_1$ of the cell because a cation not derived from the solvent i.e. an alkaline electrolyte is dialyzed.

However, when subjecting an acid solution to the electrodialysis process according to this invention, the anion which is not derived from the solvent is transferred into the countercurrently flowing electrolyte by such electrodialysis. In this case the odd numbered chambers serve as regenerating chambers while in the even numbered chambers further dilution of the acidic electrolyte takes place. The ion exchange membranes $K_1$, $K_2$, and $K_3$ are then anion exchange membranes and the ion exchange membranes $A_1$ and $A_2$ are cation exchange membranes. The starting solution with the anion to be dialyzed is first introduced into the cathode chamber $R_6$, which is separated from the adjacent chamber $R_5$ by ion exchange membrane $K_3$ selectively exchanging the anion, and is passed through even numbered cell chambers $R_4$ and $R_2$. Thereby the anion is transferred to odd numbered chambers $R_5$, $R_3$, and $R_1$.

Both methods are, of course, employed for the reversible electrodialysis of neutral starting solutions. Since the solution electrode is most sensitive to variations in concentration, the electrolyte must be introduced into anode chamber $R_1$ when using hydrogen electrodes. However, when employing oxygen electrodes, the electrolyte is introduced into the cathode chamber $R_6$.

According to another embodiment of the present invention, the starting solution may be introduced intermittently into the electrode chamber through the pores of a porous gas diffusion electrode. In this manner there is always present fresh electrolyte solution at the current supplying three-phase boundary and, due thereto, concentration polarization in the pores is avoided. Such concentration polarization may not only impair the efficiency of the electrodialysis but may even cause the formation of marginal currents which limit the velocity of dialysis in the cell.

Operation of the electrodes at a constant pH-value as it is possible by the reversible electrodialysis process according to the present invention represents an important advantage of such process because reliable and polarization-poor working of the electrodes is achieved thereby. Furthermore, there are always present at both sides of the membranes solutions which differ only slightly in their electrolyte concentration and which, therefore, hardly tend to produce osmotic exchange of water through the membranes.

It may be mentioned that the present invention cannot be used for the separation of anions and cations of a salt to form a base and an acid. It is only possible to transfer an electrolyte from one cycle to another one by proceeding according to this invention.

As stated above, electrodialysis is effected with hydrogen electrodes as well as with oxygen electrodes. A suitable hydrogen electrode is, for instance, a double skeleton catalyst valve electrode consisting of a working layer with relatively large pores of a supporting nickel skeleton having Raney nickel embedded therein and a covering layer with smaller pores of a supporting copper skeleton having Raney copper embedded therein. The electrodes are produced by hot pressing, i.e. by exposing the materials simultaneously to the action of pressure and heat. The working layer is composed of an intimate mixture of 1 part, by weight, of a Raney nickel alloy consisting of 50%, by weight, of nickel and 50%, by weight, of aluminum of a mean particle size of $50\mu$ to $75\mu$, and 1.5 parts, by weight, of carbonyl nickel forming the supporting skeleton. Said mixture is filled into and uniformly distributed throughout a mold. An intimate mixture of 1 part, by weight, of a Raney copper alloy consisting of 50%, by weight, of copper and 50%, by weight, of aluminum of a mean particle size lower than $35\mu$, and 1.2 parts, by weight, of copper powder forming the supporting skeleton is evenly distributed over said first mentioned layer and forms the covering layer. The two layers are subjected in the mold at 380° C. to a pressure of 4 metric tons per sq. cm. for 10 minutes yielding an electrode with a working layer of 2 mm. to 2.5 mm. thickness and a covering layer of 0.2 mm. thickness. This electrode is provided as electrode $E_1$ in chamber $R_1$ and hydrogen is supplied thereto under a pressure of 1.5 atm. gauge.

A hydrogen dicusion electrode useful in the process according to the present invention may consist of a supporting silver skeleton having Raney palladium embedded therein. Other double skeleton catalyst electrodes of nickel and other non-noble metals as they are described, for instance, in German Patent No. 1,019,361 may also be used whereby electrodialysis is preferably carried out at a temperature above 60° C.

Suitable oxygen electrodes are, for instance, the double skeleton electrodes of a supporting skeleton of carbonyl nickel with Raney silver embedded therein, as they are described in Austrian Patent No. 207,429. Carbon electrodes prepared according to German Patent No. 957,-491 may also be used.

The ion exchange membranes defining the cells in the electrodialysis apparatus according to the invention may be of the homogeneous type. Homogeneous cation exchange membranes are composed, for instance, of cation exchange resins of the phenol sulfonic acid-formaldehyde type. These polycondensation products are reenforced by being poured on fabrics, for instance, of glass fibers, polyamide fibers, and the like.

Heterogeneous membranes are prepared, for instance, by intimately mixing finely pulverized ion exchange resins with a binding agent, such as polyethylene, phenol-formaldehyde resins, synthetic and natural rubber, and the like and pressing the mixture to a film or membrane. It is also possible to first prepare a sheet of the binding agent by pressure between two heated revolving calendar rolls and then to incorporate the ion exchange resin into said sheet.

Other ion exchange membranes as they are known to the art may also be used.

The following examples serve to illustrate the present invention, without, however, limiting the same thereto.

EXAMPLE 1

Regeneration of a carbonated potassium hydroxide electrolyte solution.

The spent electrolyte containing potassium carbonate and diluted by reaction with water from the oxyhydrogen cells is introduced through conduit 1 into anode chamber $R_1$. It passes from there through pipe 31 into chamber $R_3$ and through pipe 53 into chamber $R_5$ and leaves the dialysis cell through pipe 2 with valve V. Another portion of the potassium hydroxide electrolyte from the oxyhydrogen cells is introduced into the dialysis cell through conduit 3 into cathode chamber 6 and passes through pipe 64 into chamber $R_4$ and through pipe 42 into chamber $R_2$ from where it is discharged through pipe 4 and recycled into the oxyhydrogen cell. The cation exchange resin membranes $K_1$, $K_2$, and $K_3$ and the anion exchange resin membranes $A_1$ and $A_2$ separate the anode and cathode chambers $R_1$ and $R_6$ from chambers $R_2$ and $R_4$ as well as $R_3$ and $R_5$. The cathode $E_2$ is a double skeleton catalyst valve electrode composed of a working layer consisting of a supporting skeleton of nickel with Raney nickel embedded therein and a covering layer consisting of a copper skeleton with Raney copper embedded therein while the hydrogen anode consists of a supporting silver skeleton with Raney palladium embedded therein. Such electrodes have been described hereinabove. The cell voltage during electrodialysis is 0.7 v. when introducing into the anode chamber $R_1$ a solution of 0.8 N potassium carbonate and 2.6 N potassium bicarbonate concentration. The electrodialysis temperature is kept at about 25° C. The current density is about 10 ma./sq. cm. The electrolyte introduced into the cathode space is of 4.5 N potassium hydroxide concentration.

When passing direct current through the apparatus, hydrogen is evolved at the cathode $E_2$ and is recycled to the anode $E_1$ where it is electrochemically dissolved.

The reactions taking place thereby are illustrated by the following equations:

(A) Anode chamber:

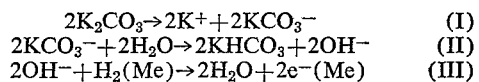

$$2K_2CO_3 \rightarrow 2K^+ + 2KCO_3^- \quad \text{(I)}$$
$$2KCO_3^- + 2H_2O \rightarrow 2KHCO_3 + 2OH^- \quad \text{(II)}$$
$$2OH^- + H_2(Me) \rightarrow 2H_2O + 2e^-(Me) \quad \text{(III)}$$

(B) Cathode chamber:

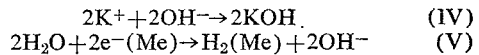

$$2K^+ + 2OH^- \rightarrow 2KOH \quad \text{(IV)}$$
$$2H_2O + 2e^-(Me) \rightarrow H_2(Me) + 2OH^- \quad \text{(V)}$$

Part of the $K^+$ ions produced by dissociation of the potassium carbonate according to Equation I is transferred through membranes $K_1$, $K_2$, and $K_3$ and chambers $R_2$ and $R_4$ to the cathode space $R_6$. The resulting $KHCO_3^-$ ions react with water according to Equation II and yield potassium bicarbonate and $OH^-$ ions. The hydroxyl ions deliver their electrons to the anode and form water with the hydrogen $H_2(Me)$ present in the anode space.

The $K^+$ ions transferred by the current to the cathode chamber $R_6$ react therein and in chambers $R_4$ and $R_2$ with the $OH^-$ ions according to Equation IV and yield potassium hydroxide which is discharged through outlet pipe 4 into the fuel cell. $OH^-$ ions are also formed at the cathode by electrochemical reduction of water to hydrogen $H_2(Me)$ according to Equation V. The hydrogen is led to anode chamber $R_1$ where it is quantitatively oxidized to yield water (Equation III). In this manner the potassium hydroxide content of the solution introduced into the apparatus through conduit 3 is increased while the solution discharged through pipe 2 is diluted with further amounts of water so that its electrolyte concentration is so low that only slightly alkaline water leaves the apparatus.

We claim:

1. The process of continuously concentrating the alkaline electrolyte solution of an oxyhydrogen element diluted by reaction water in an electrodialysis apparatus defining a first terminal chamber for the anode-operating electrode, a second terminal chamber for the cathode-operating electrode, and a total number $2n$ of alternating concentrating and diluting chambers positioned between said terminal chambers and said chambers being separated by $2n-1$ selective ion-exchange membranes, $n$ membranes thereof being selective to the ion not derived from the solvent, and $n-1$ membranes being selective to the ions of opposite polarity, said $n$ and $n-1$ membranes being alternatingly arranged starting with defining the first space by an ion-exchange membrane selective to the ion not derived from the solvent, while supplying electric current to the reversible electrodes of said apparatus, the steps which comprise introducing a first portion of diluted alkaline electrolyte of the oxyhydrogen element to the chamber containing the anode-operating electrode of the electrodialysis apparatus, passing said electrolyte through the $2n$ diluting chambers, introducing a second portion of diluted alkaline electrolyte of the oxyhydrogen element into the chamber containing the cathode-operating electrode of said apparatus, passing said electrolyte through the $2n$ concentrating chambers countercurrently to the first portion of diluted alkaline electrolyte, discharging substantially electrolyte-free solution from the chamber adjoining the cathode-containing chamber, discharging electrolyte concentrated alkaline solution from the chamber adjoining the anode-containing chamber, and recycling said concentrated alkaline electrolyte solution to the oxyhydrogen element.

2. The process according to claim 1, whereby the potential difference in the electrodialyzing device at a given current supply is kept constant by regulating the velocity of flow of said first solution.

3. The process according to claim 1, whereby the potential difference in the electrodialyzing device at varying velocity of flow of said first solution is kept constant by regulating the current supply.

4. The process of claim 1 in which the electrolyte solution is a carbonate electrolyte-containing solution.

5. The process of claim 1 in which the electrolyte contains alkali metal ions.

6. The process of claim 1 in which the electrodes are reversibly operating hydrogen or oxygen electrodes.

7. The process of continuously concentrating the acid electrolyte solution of an oxyhydrogen element diluted by reaction water in an electrodialysis apparatus defining a first terminal chamber for the anode-operating electrode, a second terminal chamber for the cathode-operating electrode, and a total number $2n$ of alternating concentrating and diluting chambers positioned between said terminal chambers and said chambers being separated by $2n-1$ selective ion-exchange membranes, $n$ membranes thereof being selective to the ion not derived from the solvent, and $n-1$ membranes being selective to the ions of opposite polarity, said $n$ and $n-1$ membranes being alternatingly arranged starting with defining the first space by an ion-exchange membrane selective to the ion not derived from the solvent, while supplying electric current to the reversible electrodes of said apparatus, the steps which comprise introducing a first portion of diluted acid electrolyte of the oxyhydrogen element to the chamber containing the cathode-operating electrode of the electrodialysis apparatus, passing said electrolyte through the $2n$ diluting chambers, introducing a second portion of diluted acid electrolyte of the oxyhydrogen element into the chamber containing the anode-operating electrode of said apparatus, passing said electrolyte through the $2n$ concentrating chambers counter-currently to the first portion of diluted acid electrolyte, discharging substantially electrolyte-free solution from the chamber adjoining the anode-containing chamber, discharging electrolyte concentrated acid solution from the chamber adjoining the cathode-containing chamber, and recycling said concentrated acid electrolyte solution to the oxyhydrogen element.

8. The process according to claim 7 whereby the potential difference in the electrodialyzing device at a given current supply is kept constant by regulating the velocity of flow of said first solution.

9. The process according to claim 7 whereby the potential difference in electrodialyzing device at varying velocity of flow of said first solution is kept constant by regulating the current supply.

10. The process of claim 7 in which the first solution is a carbonate electrolyte-containing solution.

11. The process of claim 7 in which the electrolyte contains alkali metal ions.

12. The process of claim 7 in which the electrodes are reversely operating hydrogen or oxygen electrodes.

References Cited

UNITED STATES PATENTS

| | | | |
|---|---|---|---|
| 3,124,520 | 3/1964 | Juda | 204—1.06 |
| 3,135,674 | 6/1964 | Ruetschi | 204—180 |
| 3,282,834 | 11/1966 | Justi et al. | 204—180 |
| 3,322,574 | 5/1967 | Justi et al. | |

FOREIGN PATENTS 750,500   6/1956   Great Britain.

OTHER REFERENCES

Wilson, "Demineralization by Electrodialysis," 1960, TD 433 P7, pp. 264, 265, 326–331.

JOHN H. MACK, Primary Examiner

E. ZAGARELLA, Jr., Assistant Examiner